(12) United States Patent
Jeon et al.

(10) Patent No.: US 11,494,630 B2
(45) Date of Patent: Nov. 8, 2022

(54) NEUROMORPHIC ARITHMETIC DEVICE AND OPERATING METHOD THEREOF

(71) Applicant: ELECTRONICS AND TELECOMMUNICATIONS RESEARCH INSTITUTE, Daejeon (KR)

(72) Inventors: Young-deuk Jeon, Sejong (KR); Byung Jo Kim, Sejong (KR); Ju-Yeob Kim, Daejeon (KR); Jin Kyu Kim, Sejong (KR); Ki Hyuk Park, Incheon (KR); Mi Young Lee, Daejeon (KR); Joo Hyun Lee, Daejeon (KR); Min-Hyung Cho, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 276 days.

(21) Appl. No.: 16/742,808

(22) Filed: Jan. 14, 2020

(65) Prior Publication Data

US 2020/0226456 A1 Jul. 16, 2020

(30) Foreign Application Priority Data

Jan. 15, 2019 (KR) .......................... 10-2019-0005447

(51) Int. Cl.
*G06N 3/063* (2006.01)
*G06F 7/575* (2006.01)
*G06F 17/15* (2006.01)

(52) U.S. Cl.
CPC ........... *G06N 3/0635* (2013.01); *G06F 7/575* (2013.01); *G06F 17/15* (2013.01)

(58) Field of Classification Search
CPC ........ G06F 7/575; G06F 7/5443; G06F 17/15; G06F 17/153; G06F 17/16; G06N 3/06; G06N 3/063; G06N 3/0635
See application file for complete search history.

(56) References Cited

U.S. PATENT DOCUMENTS 5,371,023 A * 12/1994 Minami ................ H01L 27/105
                                                        438/207
5,845,051 A    12/1998 Oh
                      (Continued)

FOREIGN PATENT DOCUMENTS

KR        101827779 B1    2/2018
KR       1020180101978 A   9/2018

OTHER PUBLICATIONS

J. Houxiang et al., ReCom: An Efficient Resistive Accelerator for Compressed Deep Neural Networks, EDAA 2018 (Year: 2018).*
(Continued)

*Primary Examiner* — Emily E Larocque (57) ABSTRACT

The neuromorphic arithmetic device comprises an input monitoring circuit that outputs a monitoring result by monitoring that first bits of at least one first digit of a plurality of feature data and a plurality of weight data are all zeros, a partial sum data generator that skips an arithmetic operation that generates a first partial sum data corresponding to the first bits of a plurality of partial sum data in response to the monitoring result while performing the arithmetic operation of generating the plurality of partial sum data, based on the plurality of feature data and the plurality of weight data, and a shift adder that generates the first partial sum data with a zero value and result data, based on second partial sum data except for the first partial sum data among the plurality of partial sum data and the first partial sum data generated with the zero value.

15 Claims, 10 Drawing Sheets

(56) References Cited

U.S. PATENT DOCUMENTS

| | | | |
|---|---|---|---|
| 10,817,260 B1* | 10/2020 | Huang | G06F 7/50 |
| 2011/0119215 A1 | 5/2011 | Elmegreen et al. | |
| 2017/0344876 A1* | 11/2017 | Brothers | G06N 3/04 |
| 2018/0129935 A1 | 5/2018 | Kim et al. | |
| 2018/0173677 A1* | 6/2018 | Muralimanohar | G06G 7/16 |
| 2018/0253636 A1 | 9/2018 | Lee et al. | |
| 2019/0034201 A1* | 1/2019 | Muralimanohar | G06F 9/3001 |
| 2019/0205740 A1* | 7/2019 | Judd | G06N 3/084 |

OTHER PUBLICATIONS

Shafiee et al., "ISAAC: A Convolutional Neural Network Accelerator with In-Situ Analog Arithmetic in Crossbars," ACM SIGARCH Computer Architecture News, Oct. 5, 2016.

* cited by examiner

| Layer | Number of average valid bits of feature data | Number of average valid bits of weight data | Number of digit corresponding to 0 bit of feature data | Number of digit corresponding to 0 bit of weight data | number of skip of arithmetic operation |
|---|---|---|---|---|---|
| L1 | 6.00 | 6.76 | 1 | 0 | 7 |
| L2 | 5.84 | 4.54 | 1 | 2 | 19 |
| L3 | 4.66 | 4.49 | 2 | 2 | 24 |
| L4 | 4.98 | 3.92 | 2 | 3 | 29 |
| L5 | 3.99 | 4.50 | 3 | 2 | 29 |
| L6 | 4.25 | 4.45 | 2 | 2 | 24 |
| L7 | 4.24 | 4.60 | 2 | 2 | 24 |

NEUROMORPHIC ARITHMETIC DEVICE AND OPERATING METHOD THEREOF

CROSS-REFERENCE TO RELATED APPLICATIONS

This U.S. non-provisional patent application claims priority under 35 U.S.C. § 119 to Korean Patent Application No. 10-2019-0005447, filed on Jan. 15, 2019, in Korean Intellectual Property Office, the entire contents of which are incorporated herein by reference.

BACKGROUND

Embodiments relate to a semiconductor device, and more particularly, relate to a neuromorphic arithmetic device that performs a convolution based on a neural network, and a method of operating the same.

The neuromorphic arithmetic device is a device that processes data by mimicking a brain of a human. The brain may transmit signals from one neuron to another neuron through a synapses between neurons. The brain may adjust a strength of signals transmitted from one neuron to another neuron by controlling the connection strength of the synapses. By controlling the connection strength of the synapses, information may be learned and reasoned. The neuromorphic arithmetic device may process data, based on a signal transfer technique between the neurons. A neural processing refers to processing data, using such signal processing technique.

The neuromorphic arithmetic device may be implemented with low power and low area analog multiplier-accumulators (MAC) for neural processing requiring extensive arithmetic. The analog MAC may use a scheme that converts a plurality of digital input signals into analog signals, sums the converted analog signals, and then converts the summed analog signals into digital signals. The analog MAC may multiply input data by 1 bit to improve an accuracy, and then perform MAC arithmetic based on 1-bit multiplication results. When the neuromorphic arithmetic device is operated based on such MAC arithmetic, a neural processing speed may decrease.

SUMMARY

Embodiments of the inventive concept solve the above technical problem, and provide a neuromorphic arithmetic device and a method of operating the same that may improve the arithmetic speed based on an analog MAC that performs a multiplication by 1-bit.

According to an exemplary embodiment, a neuromorphic arithmetic device comprises an input monitoring circuit that outputs a monitoring result by monitoring that first bits of at least one first digit of a plurality of feature data and a plurality of weight data are all zeros, a partial sum data generator that skips an arithmetic operation that generates a first partial sum data corresponding to the first bits of a plurality of partial sum data in response to the monitoring result while performing the arithmetic operation of generating the plurality of partial sum data, based on the plurality of feature data and the plurality of weight data, and a shift adder that generates the first partial sum data with a zero value, and generate result data, based on second partial sum data except for the first partial sum data among the plurality of partial sum data and the first partial sum data generated with the zero value.

In an embodiment, the input monitoring circuit may comprise an OR gate that receives the first bits of the first digit as inputs.

In an embodiment, the input monitoring circuit may comprise a MOSFET for receiving each of the first bits of the first digit through a gate terminal, one end of the MOSFET may be connected to a ground voltage and the other end may be connected to a power supply voltage.

In an embodiment, the partial sum data generator may comprise a multiplication register that generates multiplication bits, based on second bits of a second digit of the plurality of feature data and third bits of a third digit of the plurality of weight data, a digital to analog converter that generates an analog signal corresponding to a sum of the multiplication bits, a sample and hold circuit that samples the analog signal, and an analog to digital converter that converts the sampled analog signal into a digital signal to generate the second partial sum data.

In an embodiment, the multiplication register may multiply one of the second bits by one of the third bits to generate one of the multiplication bits.

In an embodiment, the multiplication register may be further configured to skip an operation of generating multiplication bits, based on the first bits.

In an embodiment, at least one of the second bits may be 1 and at least one of the third bits may be 1.

In an embodiment, each of the first bits may not be a bit representing a sign.

In an embodiment, the result data may correspond to a convolution result of the plurality of feature data and the plurality of weight data.

According to an exemplary embodiment, a method of operating a neuromorphic arithmetic device comprises outputting a monitoring result by monitoring that first bits of at least one first digit of a plurality of feature data and a plurality of weight data are all zeros, skipping an arithmetic operation of generating first partial sum data corresponding to the first bits in response to the monitoring result, processing a value of the first partial sum data to zero, and generating result data based on the first partial sum data that are processed as zero.

In an embodiment, the method further may comprise calculating second partial sum data based on second bits of a second digit of the plurality of feature data and third bits of a third digit of the plurality of weight data, and wherein the result data may be generated based on the first partial sum data and the second partial sum data.

In an embodiment, the calculating of the second partial sum data may comprise generating multiplication bits based on the second bits and the third bits, generating an analog signal corresponding to a sum of the multiplication bits, sampling the analog signal, and converting the sampled analog signal into a digital signal to generate the second partial sum data.

In an embodiment, at least one of the second bits may be 1 and at least one of the third bits may be 1.

In an embodiment, each of the first bits may not be a bit representing a sign.

In an embodiment, the result data corresponds to a convolution result of the plurality of feature data and the plurality of weight data.

BRIEF DESCRIPTION OF THE FIGURES

Features will become apparent to those of skill in the art by describing in detail exemplary embodiments with reference to the attached drawings in which.

DETAILED DESCRIPTION

Embodiments of the inventive concept will be described below in more detail with reference to the accompanying drawings. In the following descriptions, details such as detailed configurations and structures are provided merely to assist in an overall understanding of embodiments of the inventive concept. Modifications of the embodiments described herein can be made by those skilled in the art without departing from the spirit and scope of the inventive concept. Furthermore, descriptions of well-known functions and structures are omitted for clarity and brevity. The terms used in this specification are defined in consideration of the functions of the inventive concept and are not limited to specific functions. Definitions of terms may be determined based on the description in the detailed description.

In the following drawings or the detailed description, modules may be connected to others in addition to the components illustrated in drawing or described in the detailed description. The modules or components may be directly or indirectly connected. The modules or components may be communicatively connected or may be physically connected.

Unless defined otherwise, all terms including technical and scientific terms used herein have the same meaning as can be understood by one of ordinary skill in the art to which the inventive concept belongs. Generally, terms defined in the dictionary are interpreted to have equivalent meaning to the contextual meanings in the related art and are not to be construed as having ideal or overly formal meaning unless expressly defined in the text.

Figure 1:
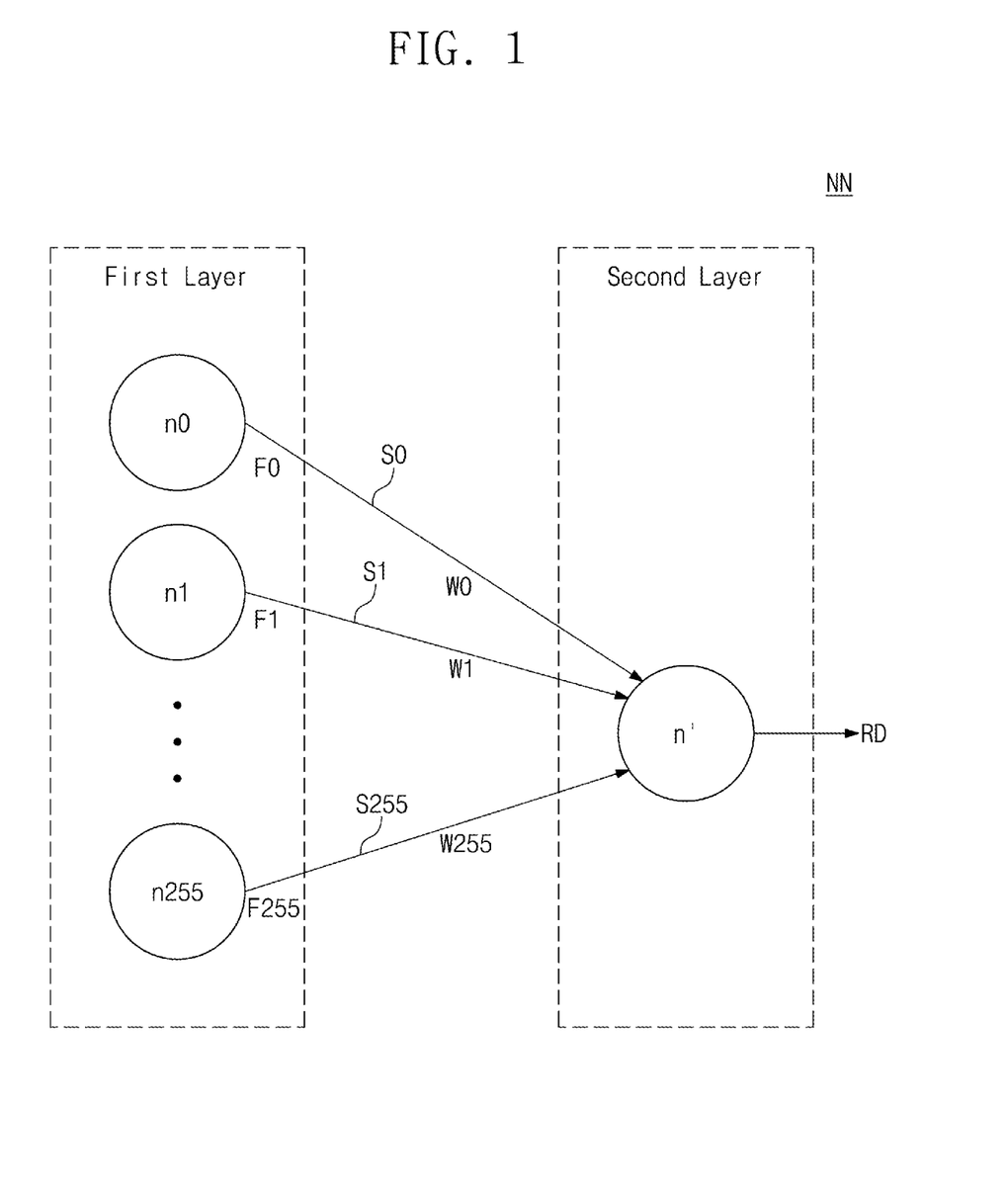
FIG. 1 illustrates an example of a neural network according to an embodiment of the inventive concept.

FIG. 1 illustrates an example of a neural network (NN) according to an embodiment of the inventive concept. Referring to FIG. 1, the neural network NN may comprise a first layer and a second layer. The first layer may comprise 256 neurons n0 to n255, and the second layer may comprise one neuron n'. The neurons n0 to n255 may be connected to the neuron n' by synapses S0 to S255. For example, the neural network NN may represent some network of a convolutional neural network (CNN).

A connection strength of the synapses S0 to S255 that connect the neurons n0 to n255 and the neuron n' may be represented by weight data W0 to W255. For example, the zeroth weight data W0 may indicate the connection strength between the zeroth neuron n0 and the neuron n'. Each values of the weight data W0 to W255 may be determined through learning for the neural network NN. A reasoning on input data may be performed based on the weight data W0 to W255 that are determined through the learning.

The neurons n0 to n255 may output feature data F0 to F255. The feature data F0 to F255 may be data input for neural processing or data generated based on the input data during neural processing. For example, when image pixel data is input for the neural processing, the feature data F0 to F255 may be the image pixel data or data generated based on the image pixel data.

The feature data F0 to F255 may be transferred to the neuron n' through the synapses S0 to S255. The neuron n' may output result data RD, based on the feature data F0 to F255 and the weight data W0 to W255. The result data RD may correspond to a convolution result of the feature data F0 to F255 and the weight data W0 to W255. That is, the result data RD as shown in Equation 1 below may be generated by multiplying each of the feature data F0 to F255 by each of the corresponding weight data W0 to W255 and then summing the multiplication results.

$$RD = \sum_{n=0}^{255} F_n * Wn \qquad \text{Equation 1}$$

Although FIG. 1 illustrates an example of the neural network NN in which 256 neurons n0 to n255 are comprised in the first layer and one neuron n' is comprised in the second layer, the inventive concept is not limited thereto. The neural network NN according to an embodiment of the inventive concept may comprise various numbers of layers, and each layer may comprise various numbers of neurons.

As described above, according to the neural network NN according to an embodiment of the inventive concept, the result data RD that are output from the neuron n' of a subsequent layer may be generated based on a convolution of the feature data F0 to F255, which are output from the neurons n0 to n255 of a previous layer, and the weight data W0 to W255. Hereinafter, for convenience of description, the inventive concept will be described with reference to an example of generating the result data RD based on the convolution of 256 feature data F0 to F255 and 256 weight data W0 to W255, as illustrated in FIG. 1. However, the inventive concept is not limited thereto, and the inventive concept may be applied to any neural processing for performing the convolution.

Figure 2:
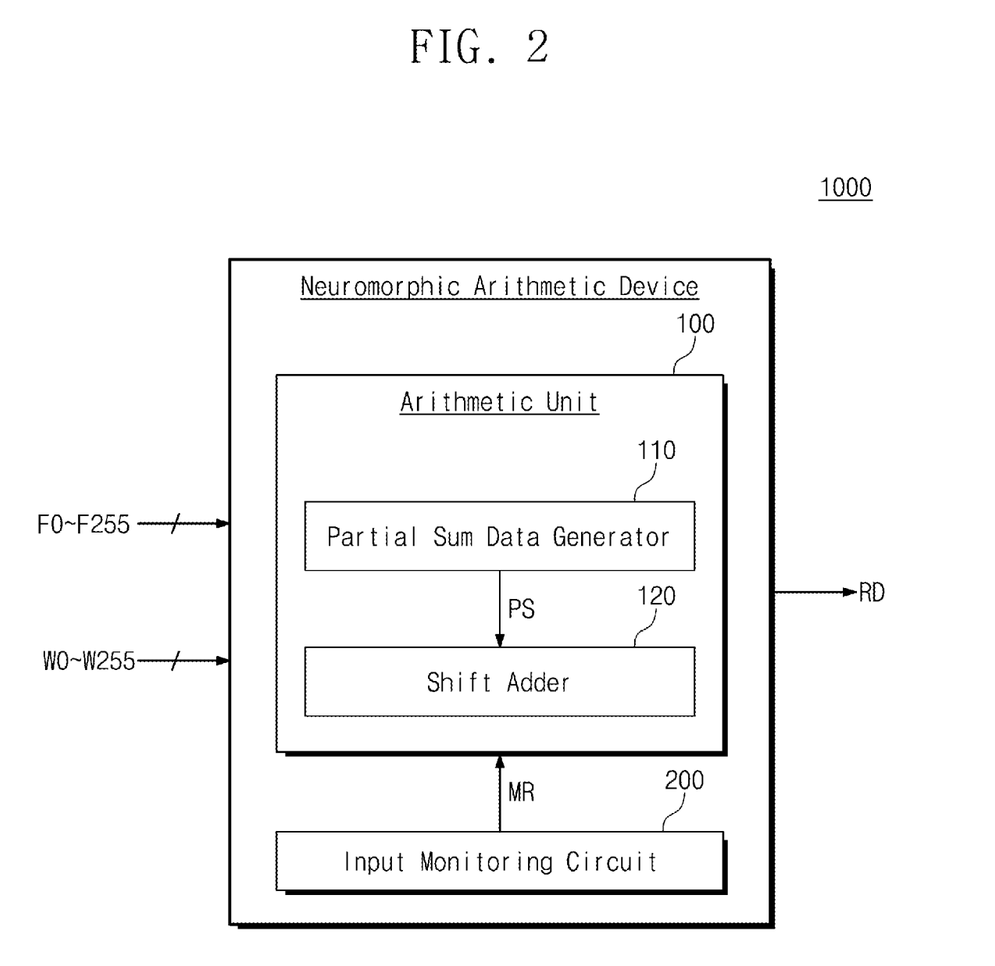
FIG. 2 illustrates a neuromorphic arithmetic device according to an embodiment of the inventive concept.
Figure 3A:
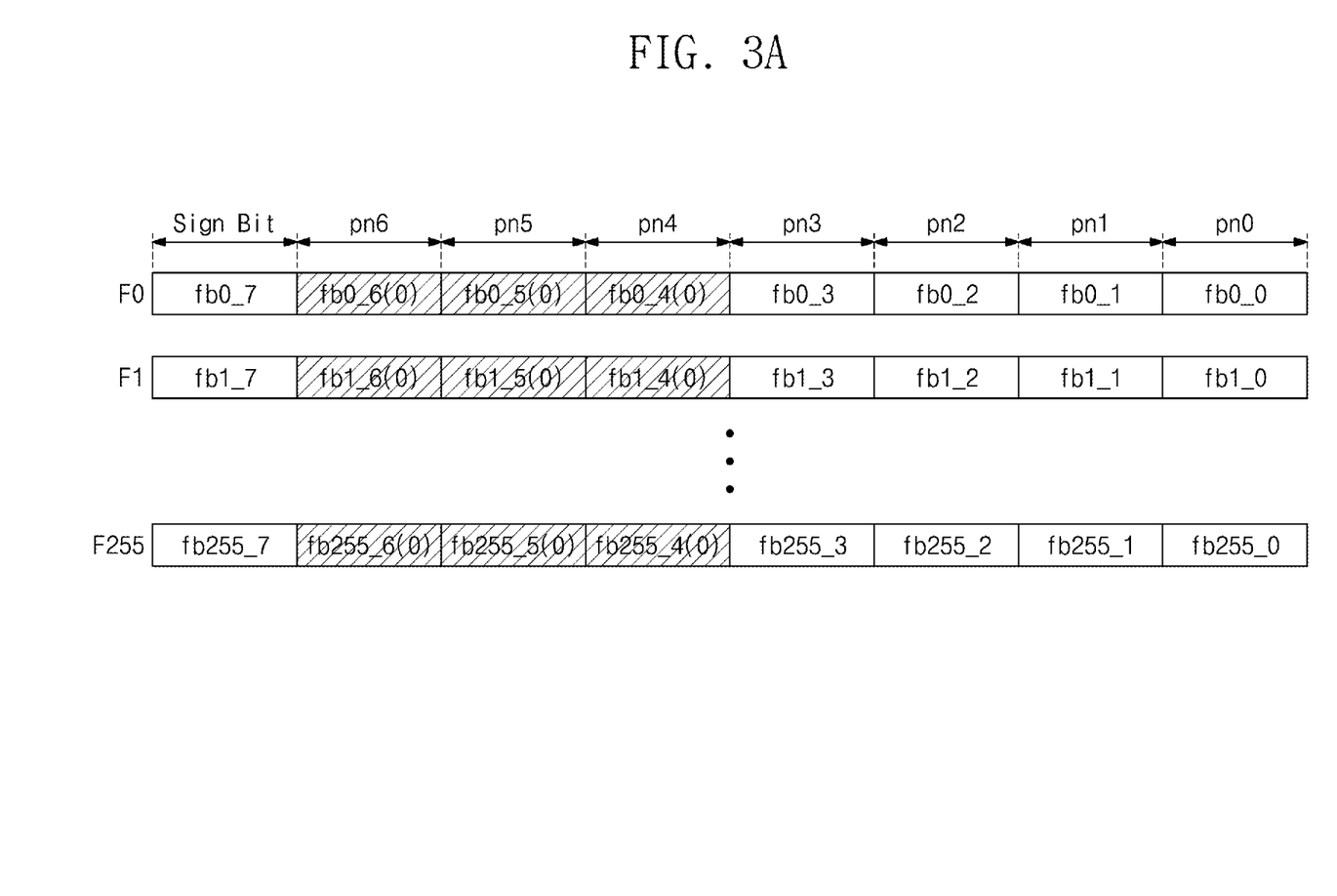
FIG. 3A illustrates an example of feature data input to a neuromorphic arithmetic device of FIG. 2.
Figure 3B:
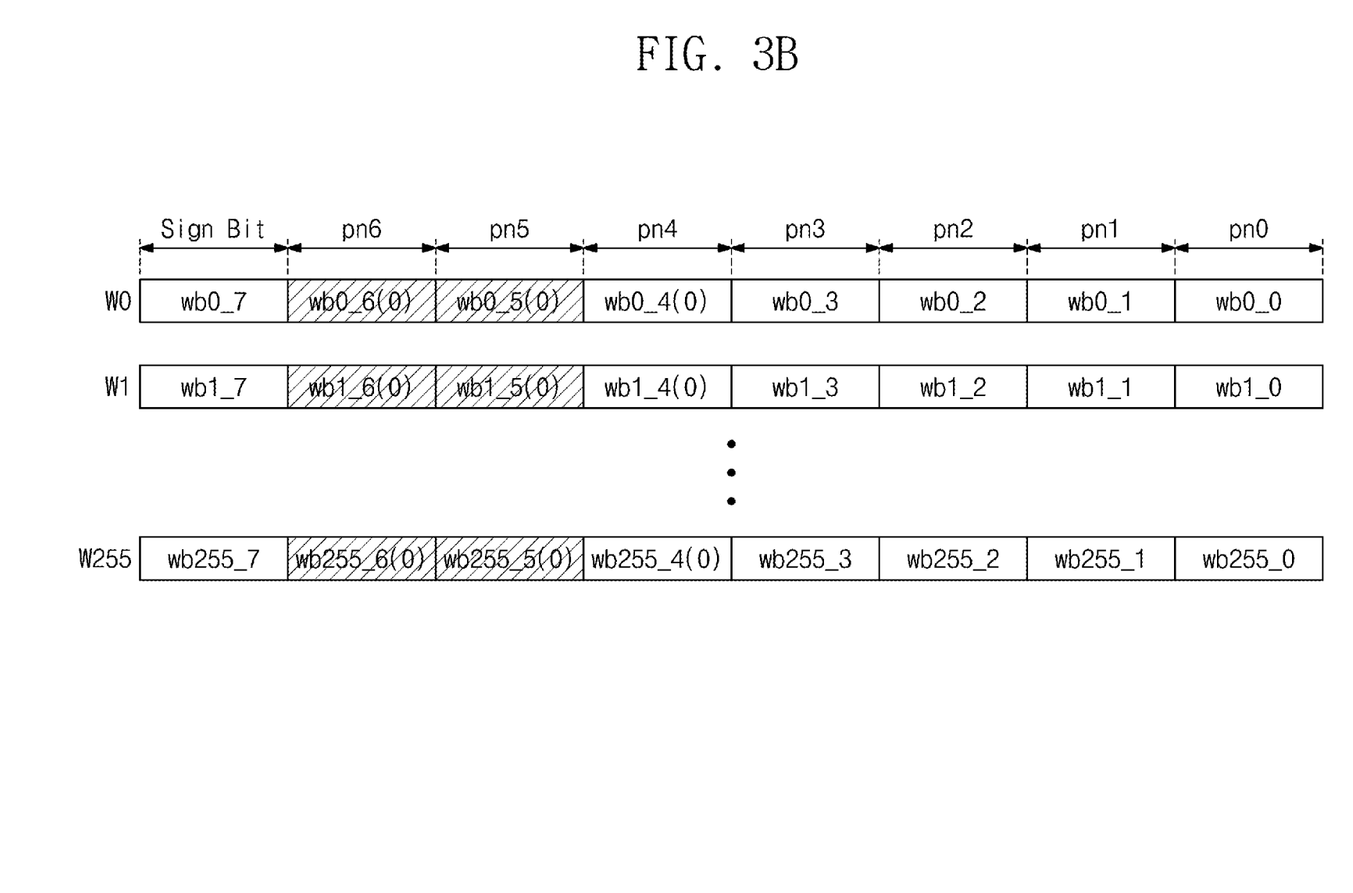
FIG. 3B illustrates an example of weight data input to a neuromorphic arithmetic device of FIG. 2.

FIG. 2 illustrates a neuromorphic arithmetic device 1000 according to an embodiment of the inventive concept. FIG. 3A illustrates an example of the feature data F0 to F255 input to the neuromorphic arithmetic device 1000 of FIG. 2. FIG. 3B illustrates an example of the weight data W0 to W255 input to the neuromorphic arithmetic device 1000 of FIG. 2.

Referring to FIG. 2, the neuromorphic arithmetic device 1000 may be implemented with various types of electronic devices or electronic circuits. For example, the neuromorphic arithmetic device 1000 may be implemented as a desktop computer, a laptop computer, a tablet computer, a smartphone, a wearable device, an internet of things (IoT) device, an electric vehicle, an integrated circuit (IC), a system on chip (SoC), etc. However, the present invention is not limited thereto, and the neuromorphic arithmetic device 1000 may be implemented as any kind of device or circuit for performing the convolution of the input data.

The neuromorphic arithmetic device 1000 may receive the feature data F0 to F255 and the weight data W0 to W255. The neuromorphic arithmetic device 1000 may generate the result data RD, based on the feature data F0 to F255 and the weight data W0 to W255. For example, as illustrated in FIGS. 3A and 3B, each of the feature data F0 to F255 and each of the weight data W0 to W255 may be 8-bit data. In this case, the most significant bit may represent a sign and the remaining bits may represent a data value. Seven bits representing the data value may correspond to different digits. Each of the seven bits may correspond to one of zeroth to sixth digits pn0 to pn6. For example, a bit fb0_0 of the zeroth feature data F0 may correspond to the zeroth digit pn0_0, and a bit fb0_1 may correspond to the first digit pn1.

The neuromorphic arithmetic device 1000 may comprise an arithmetic unit 100 and an input monitoring circuit 200. The arithmetic unit 100 may comprise a partial sum data generator 110 and a shift adder 120. The partial sum data generator 110 may generate partial sum data PS, based on the feature data F0 to F255 and the weight data W0 to W255. The partial sum data PS are data calculated by adding one-bit multiplication results of one bit of each of the feature data F0 to F255 and one bit of each of the weight data W0 to W255.

Referring to FIGS. 3A and 3B, the partial sum data PS that are calculated based on bits fb of the feature data F0 to F255 and bits wb of the weight data W0 to W255 may be represented by Equation 2 below.

$$PSxy = \sum_{n=0}^{255} \text{fbn\_x} * \text{wbn\_y}$$ Equation 2

In Equation 2 above, "x" represents digits of bits except for a sign bit of the feature data F0 to F255, "y" represents digits of bits except for the sign bit of the weight data W0 to W255. For example, the bits except for the sign bit of each of the feature data F0 to F255 may correspond to the zeroth to sixth digits pn0 to pn6.

That is, the partial sum data PS may be calculated by adding the 1-bit multiplication results of bits of a specific digit of the feature data F0 to F255 and bits of a specific digit of the weight data W0 to W255. For example, partial sum data PS00 may be generated based on bits fb0_0 to fb255_0 of the zeroth digit pn0 of the feature data F0 to F255 and bits wb0_0 to wb255_0 of the zeroth digit pn0 of the weight data W0 to W255. Partial sum data PS01 may be generated based on the bits fb0_0 to fb255_0 of the zeroth digit pn0 of the feature data F0 to F255 and bits wb0_1 to wb255_1 of first digit p1 of the weight data W0 to W255. In the example of FIGS. 3A and 3B, since the "x" and "y" values are seven, respectively, the partial sum data generator 110 may sequentially generate 49 partial sum data PS.

The partial sum data generator 110 may generate the partial sum data PS in consideration of the signs of each of the feature data F0 to F255 and the signs of each of the weight data W0 to W255. The partial sum data generator 110 may determine the sign of the partial sum data PS, using the sign bit of each of the feature data F0 to F255 and the sign bit of each of the weight data W0 to W255. Accordingly, when the feature data F0 to F255 and the weight data W0 to W255 are 256, respectively, a range of the partial sum data PS may be from −256 to 256. In this case, the partial sum data PS may have 513 values. The number of bits of the partial sum data PS that are generated from the partial sum data generator 110 may be determined depending on a calculation accuracy and a calculation speed required for the neural processing. For example, the partial sum data PS for representing 513 values may be determined to be 9-bits. In this case, since the partial sum data PS cannot represent one of the 513 values, the calculation accuracy may be partially decreased, but the calculation speed may be increased.

Referring back to FIG. 2, the shift adder 120 may add a plurality of partial sum data PS that are sequentially output. For example, the shift adder 120 may shift the digits of the partial sum data PS, based on the digits corresponding to each of the partial sum data PS, and sum the plurality of partial sum data PS, based on the shifted digits. Accordingly, the shift adder 120 may calculate the result data RD.

The input monitoring circuit 200 may monitor whether the bits of the specific digit of the feature data F0 to F255 are all zeros. In addition, the input monitoring circuit 200 may monitor whether the bits of the specific digit of the weight data W0 to W255 are all zeros. The input monitoring circuit 200 may provide the monitoring result MR to the arithmetic unit 100.

For example, as illustrated in FIGS. 3A and 3B, the input monitoring circuit 200 may monitor that the bits of the fourth to sixth digits pn4 to pn6 of the feature data F0 to F255 are all zeros. The input monitoring circuit 200 may monitor that the bits of the fifth and sixth digits pn5 and pn6 of the weight data W0 to W255 are all zeros.

The partial sum data generator 110 may skip some arithmetic operations of calculating the partial sum data PS, based on the monitoring result MR. When the bits of the specific digit are monitored as all zeros, the partial sum data generator 110 may skip the arithmetic operations that calculate the partial sum data PS associated with the bits of the specific digit.

For example, as illustrated in FIGS. 3A and 3B, when it is monitored that bits of the fourth to sixth digits pn4 to pn6 of the feature data F0 to F255 and bits of the fifth and sixth digits pn5 and pn6 of the weight data W0 to W255 are all zeros, the partial sum data generator 110 may skip the arithmetic operations that calculate the partial sum data PS associated with the bits of the fourth to sixth digits pn4 to pn6 of the feature data F0 to F255 and bits of the fifth and sixth digits pn5 and pn6 of the weight data W0 to W255. Accordingly, the partial sum data generator 110 may perform only the arithmetic operations for calculating the partial sum data PS, using only the remaining bits.

The shift adder 120 may process the value of the partial sum data PS that is not generated from the partial sum data generator 110 as 0, based on the monitoring result MR. The shift adder 120 may calculate the result data RD, based on the partial sum data PS that are generated from the partial sum data generator 110 and the partial sum data PS that are internally generated with a zero value.

Figure 4:
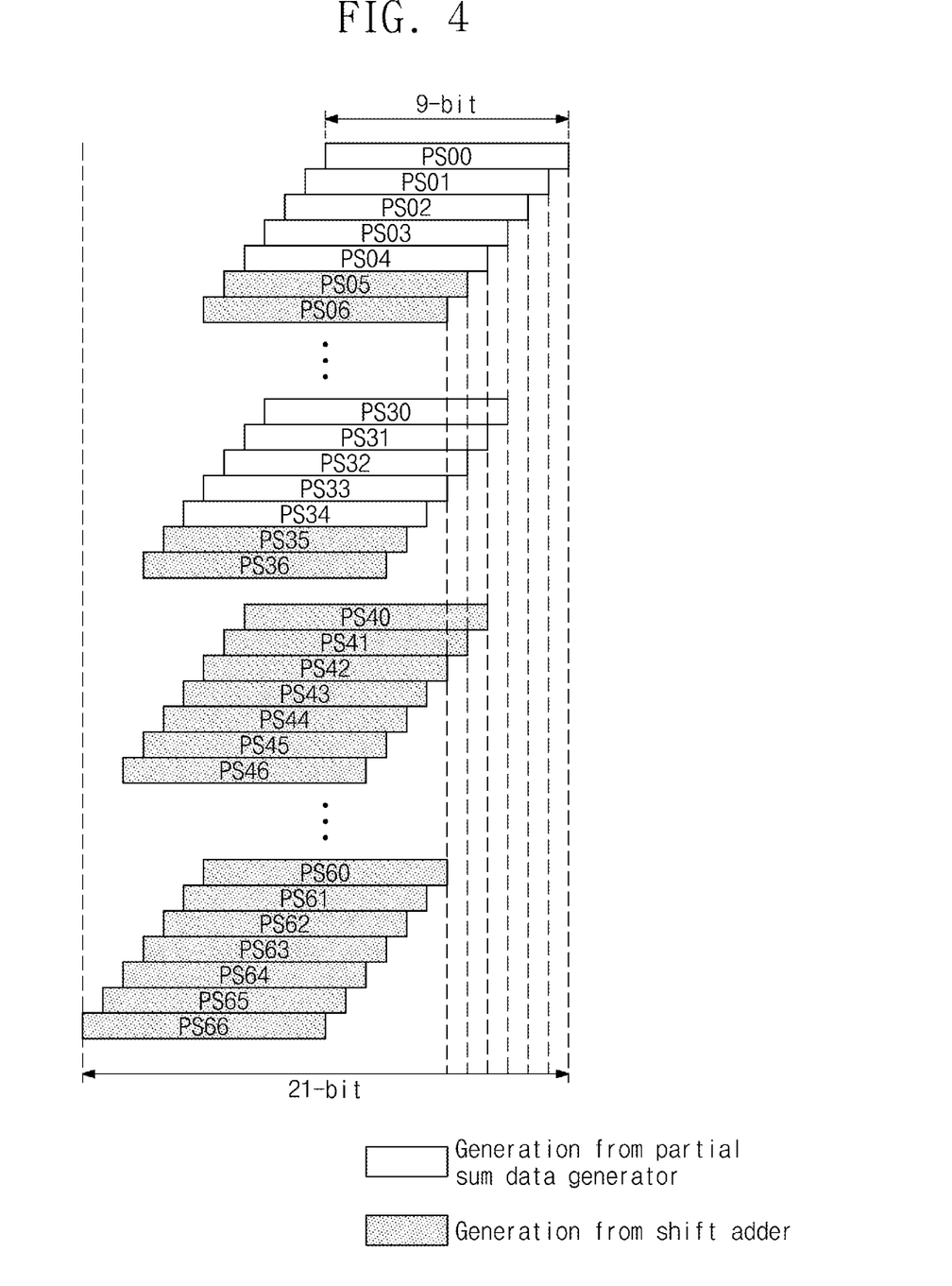
FIG. 4 illustrates an example of partial sum data according to an embodiment of the inventive concept.

FIG. 4 illustrates an example of the partial sum data PS according to an embodiment of the inventive concept. In detail, the partial sum data PS of FIG. 4 may be generated based on the feature data F0 to F255 and the weight data W0 to W255 of FIGS. 3A and 3B. That is, when the bits of the fourth to sixth digits pn4 to pn6 of the feature data F0 to F255 and the bits of the fifth and sixth digits pn5 and pn6 of the weight data W0 to W255 are all zeros, the partial sum data PS of FIG. 4 may be generated.

Referring to FIG. 4, as described in Equation 2, the 49 partial sum data PS may be generated to calculate the result data RD. For example, the partial sum data PS00 may correspond to bits of the zeroth digit pn0 of the feature data F0 to F255 and bits of the zeroth digit pn0 of the weight data W0 to W255. The partial sum data PS66 may correspond to bits of the sixth digit pn6 of the feature data F0 to F255 and bits of the sixth digit pn6 of the weight data W0 to W255.

The partial sum data generator 110 may generate the partial sum data PS, using bits of zeroth to third digits pn0 to pn3 of the feature data F0 to F255 and bits of the zeroth to fourth digits pn0 to pn4 of the weight data W0 to W255. For example, the partial sum data generator 110 may generate the partial sum data PS00, based on the bits fb0_0 to fb255_0 of the zeroth digit pn0 of the feature data F0 to F255 and the bits wb0_0 to wb255_0 of the zeroth digit pn0 of the weight data W0 to W255.

The partial sum data generator 110 may not generate the partial sum data PS associated with the bits of the fourth to sixth digits pn4 to pn6 of the feature data F0 to F255 and the bits of the fifth and sixth digits pn5 and pn6 of the weight data W0 to W255. For example, the partial sum data generator 110 may not generate partial sum data PS05 and PS15 to PS65 associated with bits wb0_5 to wb255_5 of a fifth digit pn5 of the weight data W0 to W255. Accordingly, only 20 partial sum data PS of the 49 partial sum data PS may be generated from the partial sum data generator 110 and output to the shift adder 120.

The shift adder 120 may process the value of the partial sum data PS that is not generated from the partial sum data generator 110 as 0. That is, the shift adder 120 may generate 29 partial sum data PS of the 49 partial sum data PS with a value of zero. For example, when the partial sum data PS is 9-bits, the shift adder 120 may generate the partial sum data PS05 as '000000000'. The shift adder 120 may generate the result data RD by adding the 20 partial sum data PS generated from the partial sum data generator 110 and the 29 partial sum data PS generated therein. The shift adder 120 may add depending on the digits corresponding to each partial sum data PS. Accordingly, the result data RD generated from the shift adder 120 may be 21-bits.

As described above, the neuromorphic arithmetic device 1000 according to an embodiment of the inventive concept may monitor whether bits of the specific digit of the feature data F0 to F255 and the weight data W0 to W255 are all zeros, and then skip some arithmetic operations depending on the monitoring result. Accordingly, the calculation speed of the neuromorphic arithmetic device 1000 that calculates the result data RD corresponding to the convolution of the feature data F0 to F255 and the weight data W0 to W255 may be increased. In addition, since some arithmetic operations are skipped, the neuromorphic arithmetic device 1000 may operate at low power.

Figure 5:
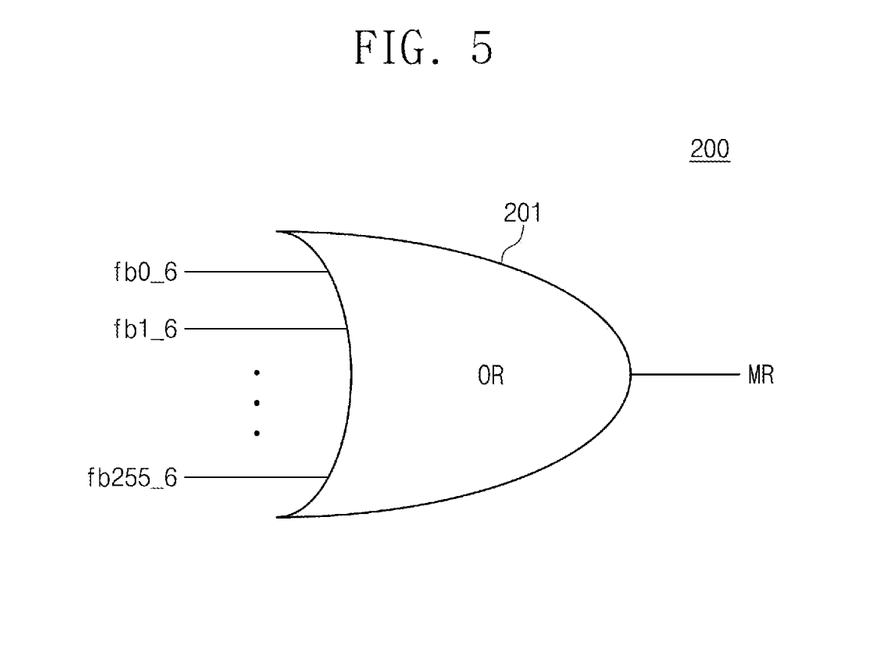
FIG. 5 illustrates one example of an input monitoring circuit of FIG. 2.

FIG. 5 illustrates one example of the input monitoring circuit 200 of FIG. 2. In more detail, FIG. 5 illustrates an example where the input monitoring circuit 200 is implemented as a digital circuit. Referring to FIG. 5, the input monitoring circuit 200 may comprise an OR gate 201. The OR gate 201 may receive bits of a specific digit of the feature data F0 to F255 or the weight data W0 to W255 as inputs. The OR gate 201 may output the monitoring result MR, based on a value of input bits.

For example, as illustrated in FIG. 5, bits fb0_6 to fb255_6 of the sixth digit pn6 of the feature data F0 to F255 may be input to the OR gate 201. In this case, when the bits fb0_6 to fb255_6 are all zeros, the OR gate 201 may output zero. When there is even one bit whose value is '1' among the bits fb0_6 to fb255_6, the OR gate 201 may output '1'. That is, when all of the input bits are '0', '0' may be output as the monitoring result MR. However, the inventive concept is not limited thereto, and when an inverter is added to an output terminal of the OR gate 201 or the OR gate 201 is replaced with a NOR gate, 1 may be output as the monitoring result MR.

FIG. 5 illustrates an example in which the bits fb0_6 to fb255_6 of the sixth digit pn6 of the feature data F0 to F255 are input to the OR gate 201, but the inventive concept is not limited thereto.

Figure 6:
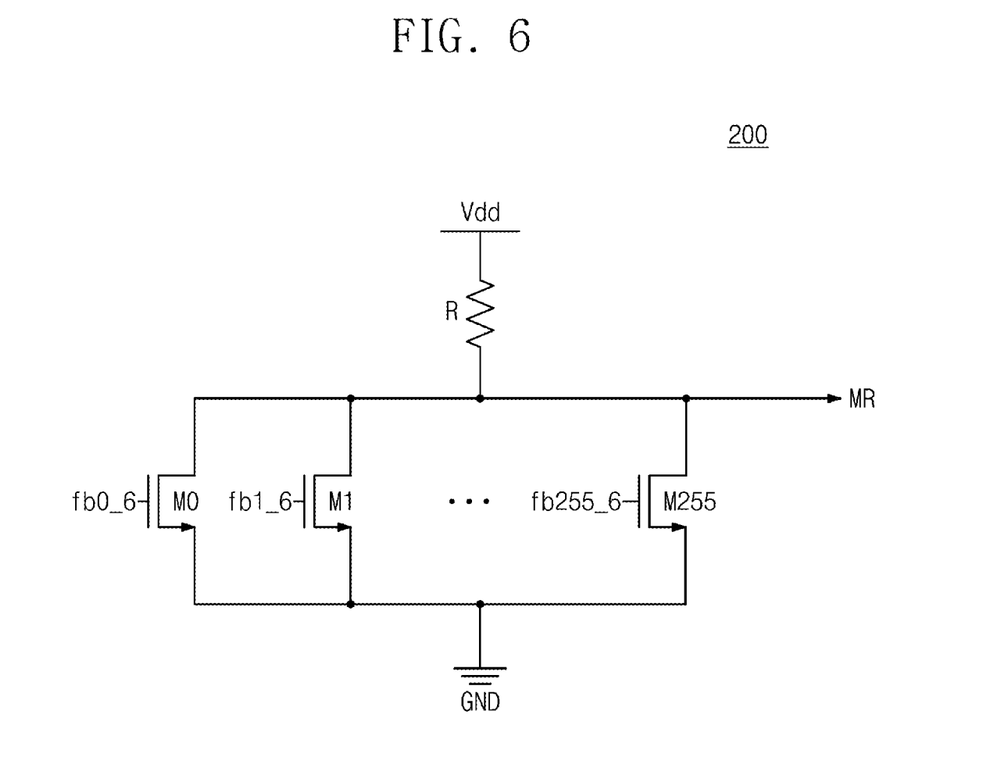
FIG. 6 illustrates another example of an input monitoring circuit of FIG. 2.

FIG. 6 illustrates another example of the input monitoring circuit 200 of FIG. 2. In more detail, FIG. 6 illustrates an example in which the input monitoring circuit 200 is implemented as an analog circuit. Referring to FIG. 6, the input monitoring circuit 200 may comprise 0th to 255th NMOSs (n-channel MOSFETs) M0 to M255 and a resistor R. One end of the NMOSs M0 to M255 may be connected to a power supply voltage Vdd through the resistor R, and the other end thereof may be connected to a ground voltage GND. Bits of a specific digit of the feature data F0 to F255 or the weight data W0 to W255 may be input to gate terminals of the NMOSs M0 to M255. The input monitoring circuit 200 may output the monitoring result MR, based on a node voltage between the one end of the NMOSs M0 to M255 and the resistor R.

For example, as illustrated in FIG. 6, the bits fb0_6 to fb255_6 of the sixth digit pn6 of the feature data F0 to F255 may be input to gate terminals of the NMOSs M0 to M255. When the bits fb0_6 to fb255_6 are all zeros, the NMOSs M0 to M255 are all turned off, and a voltage (i.e., 1) corresponding to the power supply voltage Vdd may be output as the monitoring result MR. When any one of the bits fb0_6 to fb255_6 is '1', one of the NMOSs M0 to M255 is turned on, and a voltage (i.e., 0) corresponding to the ground voltage GND may be output as the monitoring result MR. That is, when the bits input to the gate terminals are all zeros, '1' may be output as the monitoring result MR. However, the inventive concept is not limited thereto, and when an inverter is added to the output terminal, zero may be output as the monitoring result MR.

FIG. 6 illustrates an example in which the bits fb0_6 to fb255_6 of the sixth digit pn6 of the feature data F0 to F255 are input to the gate terminals of the NMOSs M0 to M255, but the inventive concept is not limited thereto.

Figure 7:
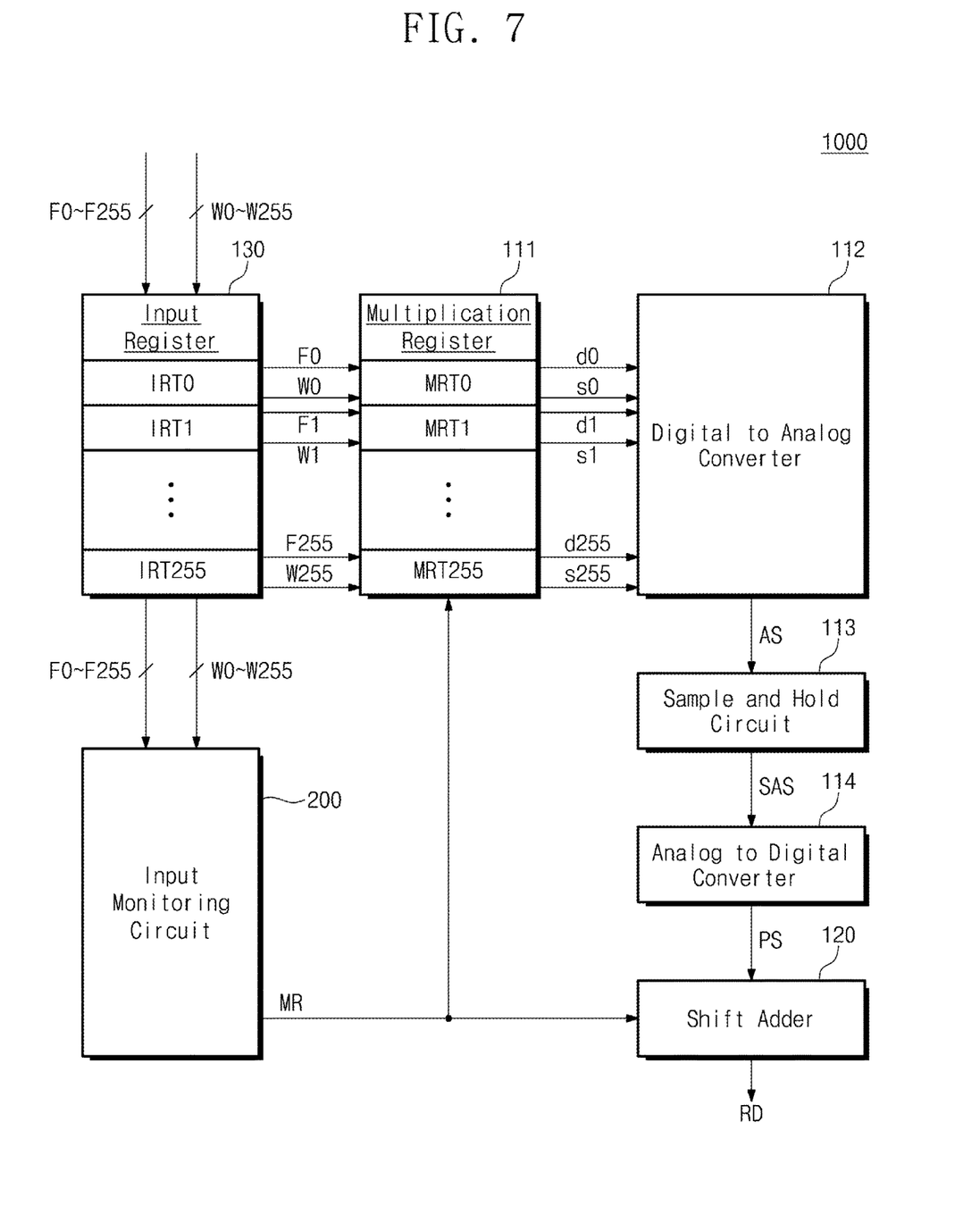
FIG. 7 illustrates a block diagram describing one example of a neuromorphic arithmetic device of FIG. 2.

FIG. 7 illustrates a block diagram describing one example of the neuromorphic arithmetic device 1000 of FIG. 2. Referring to FIG. 7, the neuromorphic arithmetic device 1000 comprises a multiplication register 111, a digital to analog converter 112, a sample and hold circuit 113, an analog to digital converter 114, the shift adder 120, an input register 130, and the input monitoring circuit 200. The multiplication register 111, the digital to analog converter 112, the sample and hold circuit 113, and the analog to digital converter 114 may be comprised in the partial sum data generator 110 of FIG. 2.

The input register 130 may receive the feature data F0 to F255 and the weight data W0 to W255. The input register 130 may comprise 0th to 255th registers IRT0 to IRT255. The input register 130 may store the feature data F0 to F255 and the weight data W0 to W255, which are received, in the registers IRT0 to IRT255. For example, the zeroth feature data F0 and the zeroth weight data W0 may be stored in the zeroth register IRT0. The input register 130 may transfer the feature data F0 to F255 and the weight data W0 to W255 to the input monitoring circuit 200 and the multiplication register 111.

The input monitoring circuit 200 may monitor whether bits of a specific digit of the feature data F0 to F255 are all zeros. In addition, the input monitoring circuit 200 may monitor whether bits of a specific digit of the weight data W0 to W255 are all zeros. The input monitoring circuit 200 may provide the monitoring result MR to the multiplication register 111 and the shift adder 120.

Figure 7A:
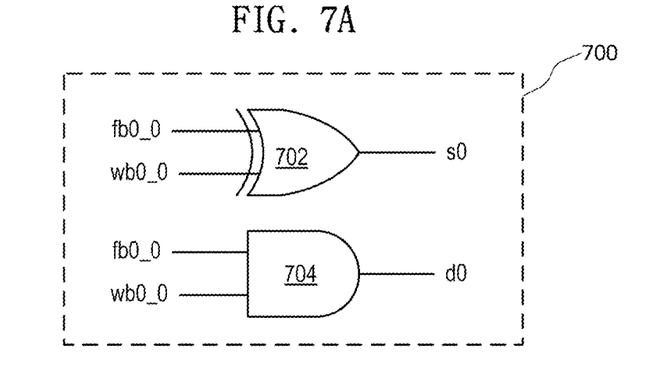
FIG. 7A illustrates an example of a multiplication circuit within the multiplication register shown in FIG. 7 according to an embodiment.

The multiplication register 111 may comprise 0th to 255th registers MRT0 to MRT255. Each of the registers MRT0 to MRT255 may multiply one bit of each of the feature data F0 to F255 by one bit of each of the weight data W0 to W255, and may output multiplication bits d0 to d255 and s0 to s255. For example, as shown in in FIG. 7A, the 0th register MRT0 700 may output the multiplication bit s0 by multiplying the sign bit of the 0th feature data F0 by the sign bit of the 0th weight data W0 using the exclusive-OR (XOR) gate 702. The 0th register MRT0 may sequentially output the multiplication bit d0 by sequentially multiplying the remaining bits of the 0th feature data F0 by the remaining bits of the 0th weight data W0 by one bit. For example, as illustrated in FIGS. 3A and 3B, the 0th register MRT0 may output the multiplication bit d0 by multiplying the bit fb0_0 of the 0th feature data F0 by the bit wb0_0 of the 0th weight data W0 using the AND gate 702. Thereafter, the 0th register MRT0 may output the multiplication bit d0 by multiplying the bit fb0_0 of the 0th feature data F0 by the bit wb0_1 of the 0th weight data W0.

When the bits of the specific digit of the feature data F0 to F255 or the weight data W0 to W255 are all zeros, the registers MRT0 to MRT255 may not output the multiplication bits d0 to d255, which may be generated based on bits of the specific digit.

For example, as illustrated in FIGS. 3A and 3B, when bits fb0_4 to fb255_4 of the fourth digit pn4 of the feature data F0 to F255 are all zeros, the registers MRT0 to MRT255 may not output the multiplication bits d0 to d255, which may be generated based on the bits fb0_4 to fb255_4. When the bits of the fourth to sixth digits pn4 to pn6 of the feature data F0 to F255 and the bits of the fifth and sixth digits pn5 and pn6 of the weight data W0 to W255 are all zeros, the registers MRT0 to MRT255 may output only the multiplication bits d0 to d255 of the bits of the zeroth to third digits pn0 to pn3 of the feature data F0 to F255 and the bits of the zeroth to fourth digits pn0 to pn4 of the weight data W0 to W255. Accordingly, the registers MRT0 to MRT255 may sequentially output the multiplication bits d0 to d255 20 times. When the monitoring result MR is not used, the multiplication bits d0 to d255 may be sequentially output 49 times. That is, as the monitoring result MR is used, the number of times the multiplication bits d0 to d255 are output may be decreased.

The digital to analog converter 112 may generate an analog signal AS corresponding to a sum of the multiplication bits d0 to d255, based on the multiplication bits d0 to d255 and s0 to s255. The sample and hold circuit 113 may sample the analog signal AS and maintain a sampled analog signal SAS. The analog to digital converter 114 may convert the sampled analog signal SAS into a digital signal to generate the partial sum data PS. The partial sum data PS generated by the analog to digital converter 114 may be provided to the shift adder 120.

For example, when the multiplication bits d0 to d255 are output based on the bits of the 0th digit pn0 of the feature data F0 to F255 and the bits of the 0th digit pn0 of the weight data W0 to W255, from the multiplication register 111, the analog to digital converter 114 may generate the partial sum data PS00. Subsequently, when the multiplication bits d0 to d255 are output based on the bits of the 0th digit pn0 of the feature data F0 to F255 and the bits of the first digit p1 of the weight data W0 to W255, from the multiplication register 111, the analog to digital converter 114 may generate the partial sum data PS01. As such, the analog to digital converter 114 may sequentially generate the partial sum data PS, based on the multiplication bits d0 to d255 that are provided sequentially from the multiplication register 111.

The shift adder 120 may generate the result data RD by shifting the partial sum data PS sequentially output by the number of the digit and performing the addition. When the bits of a specific digit are all zeros, the partial sum data PS associated with bits of the specific digit may not be generated from the analog to digital converter 114. In this case, the shift adder 120 may process the value of the partial sum data PS that is not generated by the analog to digital converter 114 as a zero value. The shift adder 120 may generate the result data RD, based on the partial sum data PS generated as the zero value therein and the partial sum data PS generated by the analog to digital converter 114.

As described above, the neuromorphic arithmetic device 1000 according to an embodiment of the inventive concept may be implemented as an analog MAC that performs the convolution based on 1-bit multiplication. The neuromorphic arithmetic device 1000 may decrease the number of operations of the multiplication register 111, the digital to analog converter 112, the sample and hold circuit 113, and the analog to digital converter 114, by using the monitoring result MR. Accordingly, the operation speed of the neuromorphic arithmetic device 1000 may be improved, and the calculation operation may be performed at low power.

Figure 8:
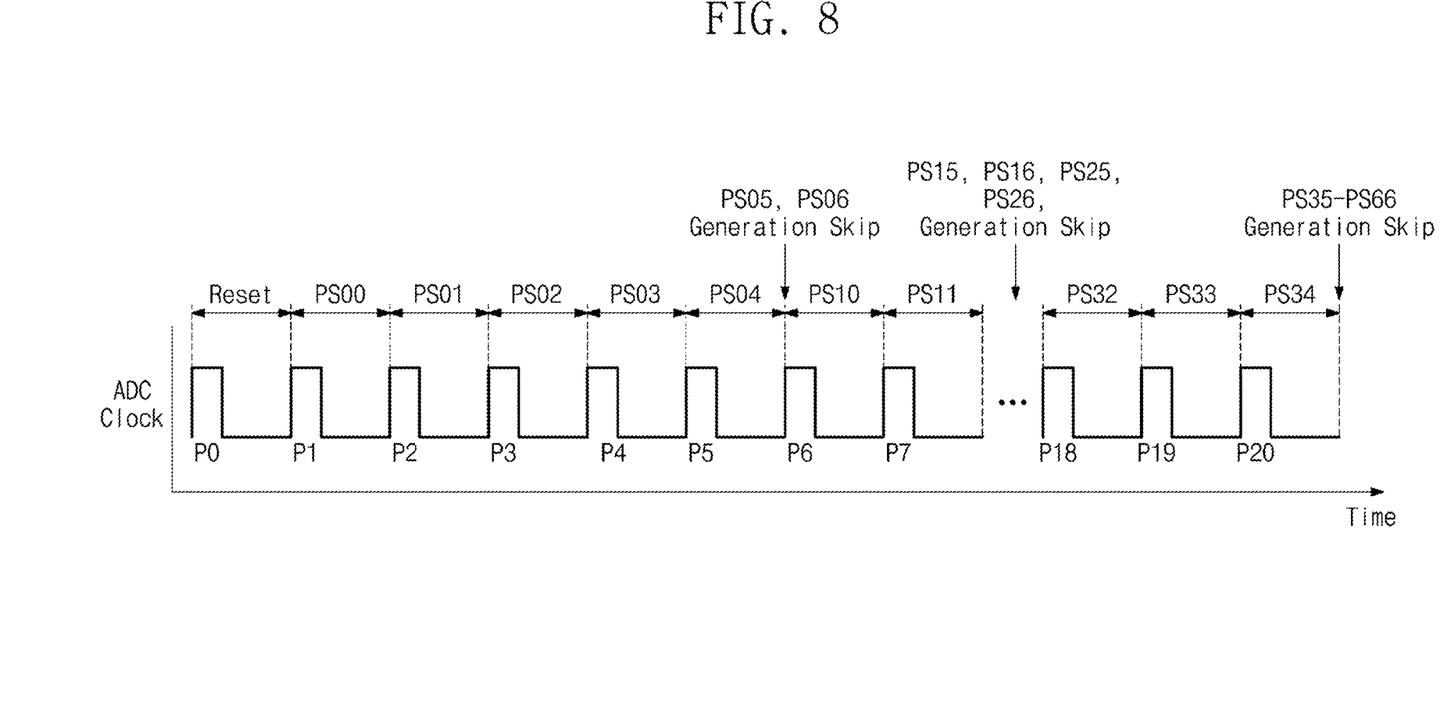
FIG. 8 illustrates a timing diagram describing one example of an operation of an analog to digital converter of FIG. 7.

FIG. 8 illustrates a timing diagram describing one example of an operation of the analog to digital converter 114 of FIG. 7. Specifically, as described with reference to FIGS. 3A to 4, the operation of the analog to digital converter 114 will be described under assumption that it is monitored that the bits of the fourth to sixth digits pn4 to pn6 of the feature data F0 to F255 and the bits of the fifth and sixth digits pn5 and pn6 of the weight data W0 to W255 are all zeros.

Referring to FIGS. 4 and 8, a clock may be provided to the analog to digital converter 114 over time. The clock may comprise 0th to 20th pulses P0 to P20. The analog to digital converter 114 may be reset in response to the 0th pulse P0. Thereafter, the analog to digital converter 114 may sequentially generate the partial sum data PS in response to the sequentially provided pulses. The analog to digital converter 114 may sequentially generate the partial sum data PS00 to PS04 in response to first to fifth pulses P1 to P5. Since the bits of the fifth and sixth digits pn5 and pn6 of the weight data W0 to W255 are all zeros, the multiplication register 111 may not output the multiplication bits d0 to d255 corresponding to the partial sum data PS05 and PS06. Accordingly, the analog to digital converter 114 may generate the partial sum data PS04 and then skip the generation of the partial sum data PS05 and PS06. In other words, the analog to digital converter 114 may generate the partial sum data PS04 and then generate partial sum data PS10 in response to the sixth pulse P6.

Likewise, the analog to digital converter 114 may skip the generation of partial sum data PS15, P16, PS25, and PS26. As illustrated in FIG. 8, the analog to digital converter 114 may sequentially generate partial sum data PS32 to PS34 in response to the eighteenth to twentieth pulses P18 to P20.

Since the bits of the fourth to sixth digits pn4 to pn6 of the feature data F0 to F255 and the bits of the fifth and sixth digits pn5 and pn6 of the weight data W0 to W255 are all zeros, the multiplication register 111 may not output the multiplication bits d0 to d255 corresponding to the partial sum data PS35 to PS66. Accordingly, the analog to digital converter 114 may generate the partial sum data PS33 and then skip the generation of the partial sum data PS35 to PS66.

As described above, the analog to digital converter 114 may generate only 20 partial sum data PS among 49 partial sum data PS for calculating the result data RD. That is, the analog to digital converter 114 may operate based on 20 clock pulses P1 to P20 to calculate the result data RD. When the analog to digital converter 114 generates the 49 partial sum data PS, the analog to digital converter 114 may operate based on 49 clock pulses to calculate the result data RD. Therefore, according to an embodiment of the inventive concept, the calculation time for calculating the result data RD may be decreased.

The shift adder 120 may generate the partial sum data PS (e.g., the partial sum data PS05) that is not generated by the analog to digital converter 114 to a value of zero. The shift adder 120 may calculate the result data RD based on the 20 partial sum data PS generated by the analog to digital converter 114 and the 29 partial sum data PS generated therein.

Figure 9:
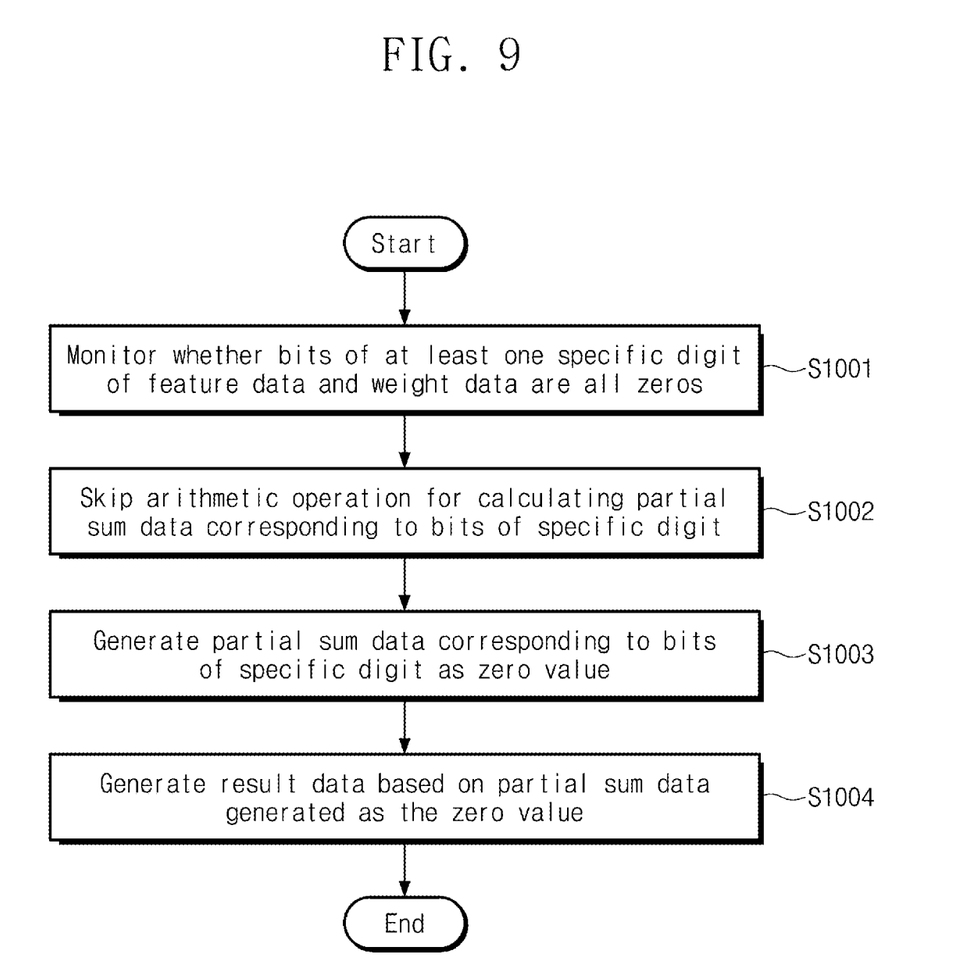
FIG. 9 illustrates a flowchart describing an example of an operation of a neuromorphic arithmetic device of FIG. 2.

FIG. 9 illustrates a flowchart describing an example of an operation of the neuromorphic arithmetic device 1000 of FIG. 2. Referring to FIGS. 2 and 9, in operation S1001, the neuromorphic arithmetic device 1000 may monitor whether the bits of at least one specific digit of the feature data F0 to F255 and the weight data W0 to W255 are all zeros. In operation S1002, the neuromorphic arithmetic device 1000 may skip the arithmetic operation of calculating the partial sum data PS corresponding to the monitored bits of the specific digit. Accordingly, some partial sum data PS of the plurality of partial sum data PS for calculating the result data RD may not be generated from the partial sum data generator 110.

In operation S1003, the neuromorphic arithmetic device 1000 may generate partial sum data PS corresponding to the bits of the specific digit as the zero value. That is, the shift adder 120 may process the value of the partial sum data PS that is not generated by the partial sum data generator 110 as zero. In operation S1004, the neuromorphic arithmetic device 1000 may generate the result data RD based on the partial sum data PS generated as the zero value. In this case, not only the partial sum data PS generated by the shift adder 120 but also the partial sum data PS generated by the partial sum data generator 110 may be used to generate the result data RD.

Figure 10:
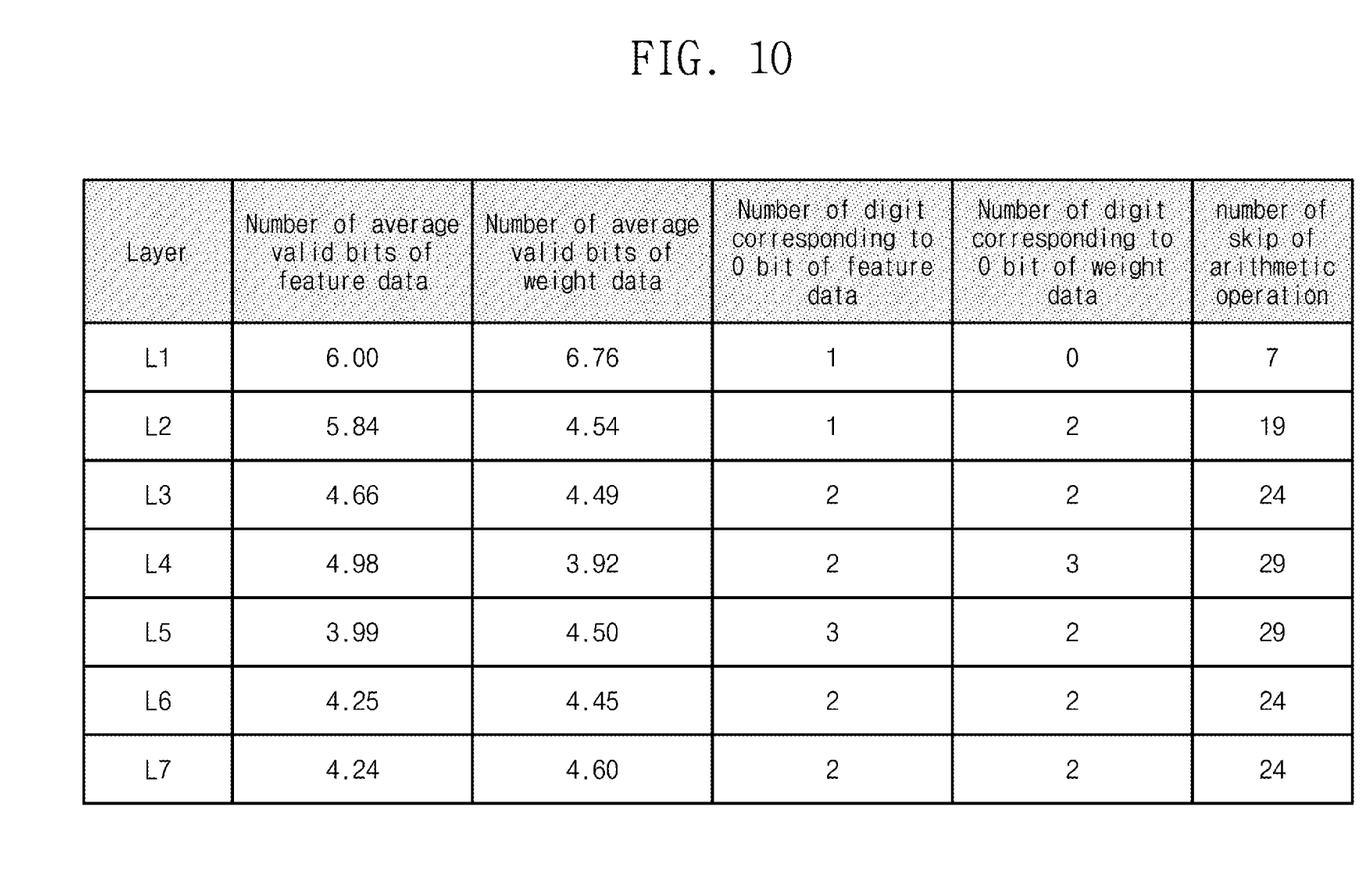
FIG. 10 illustrates a table describing an example of the number of skips of an arithmetic operation according to a neuromorphic arithmetic device of FIG. 2.

FIG. 10 illustrates a table describing an example of the number of skips of an arithmetic operation according to the neuromorphic arithmetic device 1000 of FIG. 2. Referring to FIG. 10, the number of skips of the arithmetic operation for calculating partial sum data PS, based on vgg16, which is one of convolutional neural network (CNN) models, is illustrated. When the feature data and the weight data are 8 bits, respectively, it is assumed that the number of bits for representing the actual data value among the 7 bits except for the sign bit is the number of valid bits. For example, when the number of the valid bits is five, the upper two bits of the 7-bits may be zeros.

For each layer, the monitoring result MR may vary based on the number of average valid bits of the feature data and the number of average valid bits of the weight data. The number of skip of the arithmetic operation for calculating the partial sum data PS may vary depending on the monitoring result MR. For example, in a first layer L1, when the number of average valid bits of the feature data are 6.00 and the number of average valid bits of the weight data are 6.76, the number of digit corresponding to 0 bit (i.e., invalid bit) of the feature data may be 1, and the number of digit corresponding to 0 bit of the weight data may be 0. In this case, the arithmetic operation of calculating the seven partial sum data PS may be skipped.

For example, in a fifth layer L5, when the number of average valid bits of the feature data are 3.99 and the number of average valid bits of the weight data are 4.50, the monitoring result MR may be generated as illustrated in FIGS. 3A and 3B. That is, the number of digit corresponding to '0' bit of the feature data may be '3', and the number of digit corresponding to '0' bit of the weight data may be '2'. In this case, as described above, the arithmetic operation of calculating the 29 partial sum data PS may be skipped.

As illustrated in FIG. 10, when the neural processing is performed based on the neural network having multiple layers, the arithmetic operation of calculating the partial sum data PS may be decreased by about half Therefore, the operation speed of the neuromorphic arithmetic device 1000 may be improved by about two times or more, and the neuromorphic arithmetic device 1000 may operate at low power.

A neuromorphic arithmetic device according to an embodiment of the inventive concept may monitor bits of input data and may skip some arithmetic operations according to the monitoring result. As a result, the operation speed of the neuromorphic arithmetic device is improved, and the neuromorphic arithmetic device may operate at low power.

The contents described above are specific embodiments for implementing the inventive concept. The inventive concept may comprise not only the embodiments described above but also embodiments in which a design is simply or easily capable of being changed. In addition, the inventive concept may also comprise technologies easily changed to be implemented using embodiments. Therefore, the scope of the inventive concept is not limited to the described embodiments but should be defined by the claims and their equivalents.

What is claimed is:

1. A neuromorphic arithmetic device comprising:
an input monitoring circuit to:
  receive a plurality of feature data and a plurality of weight data, each feature data including a plurality of bits respectively corresponding to feature digits and each weight data including a plurality of bits respectively corresponding to weight digits, and
  output a monitoring result indicating for each feature digit whether the corresponding bits in the plurality of feature data are all zero and indicating for each weight digit whether the corresponding bits in the plurality of weight data are all zeros;
a partial sum data generator to, for each combination of a weight digit and a feature digit:
  generate corresponding partial sum data when the monitoring result indicates that the bits of the plurality of feature data corresponding to the feature digit are not all zero and that the bits of the plurality of weight data corresponding to the weight digit are not all zero, and
  not generate the corresponding partial sum data when the monitoring result indicates that the bits of the plurality of feature data corresponding to the feature digit are all zero, that the bits of the plurality of weight data corresponding to the weight digit are all zero, or both; and a shift adder to generate result data using, for each combination of the weight digit and the feature digit:
the corresponding partial sum data when the monitoring result indicates that the bits of the plurality of feature data corresponding to the feature digit are not all zero and indicates that the bits of the plurality of weight data corresponding to the weight digit are not all zero, and
a zero value otherwise.

2. The neuromorphic arithmetic device of claim 1, wherein the input monitoring circuit comprises a first OR gate that receives all bits among the plurality of weight data that correspond to a weight digit as inputs or a second OR gate that receives all bits among the plurality of feature data that correspond to a feature digit as inputs.

3. The neuromorphic arithmetic device of claim 1, wherein the input monitoring circuit comprises a first plurality of Metal Oxide Semiconductor Field Effect Transistors (MOSFETs) for respectively receiving bits among the plurality of weight data that correspond to a weight digit, a second plurality of Metal Oxide Semiconductor Field Effect Transistors (MOSFETs) for respectively receiving bits among the plurality of feature data that correspond to a feature digit, or both, wherein each MOSFET of the first or second plurality of MOSFETS receives a respective bit through a gate terminal, has one end connected to a ground voltage and has an other end connected through a resistance to a power supply voltage.

4. The neuromorphic arithmetic device of claim 1, wherein the partial sum data generator comprises:
a multiplication register to:
receive a plurality of feature bits corresponding to bits of the plurality of feature data corresponding to a selected feature digit,
receive a plurality of weight bits corresponding to bits of the plurality of weight data corresponding to a selected weight digit,
generate a plurality of multiplication bits by bit-wise multiplying the plurality of feature bits by the plurality of weight bits, respectively;
a digital to analog converter to generate an analog signal corresponding to a sum of the plurality of multiplication bits;
a sample and hold circuit to sample the analog signal; and
an analog to digital converter to convert the sampled analog signal into a digital signal to generate the partial sum data.

5. The neuromorphic arithmetic device of claim 4, wherein the multiplication register is further configured to skip an operation of generating multiplication bits when the monitoring result indicates that the bits of the plurality of feature data corresponding to the selected feature digit are all zero, that the bits of the plurality of weight data corresponding to the selected weight digit are all zero, or both.

6. The neuromorphic arithmetic device of claim 4, wherein at least one of the plurality of feature bits is 1 and at least one of the plurality of weight bits is 1.

7. The neuromorphic arithmetic device of claim 4, wherein each feature data further comprises a sign bit, wherein each weight data further comprises a sign bit, wherein each partial sum data further comprises a sign bit, and
wherein the partial sum generator is further configured to, for each combination of the weight digit and the feature digit, when the monitoring result indicates that the bits of the plurality of feature data corresponding to the feature digit are not all zero and that the bits of the plurality of weight data corresponding to the weight digit are not all zero, determine the sign bit of the corresponding partial sum data according to the sign bits of each of the plurality of weight data and the sign bits of each of the plurality of feature data.

8. The neuromorphic arithmetic device of claim 1, wherein each of the bits respectively corresponding to feature digits first is not a bit representing a sign, and
wherein each of the bits respectively corresponding to weight digits is not a bit representing a sign.

9. The neuromorphic arithmetic device of claim 1, wherein the result data corresponds to a convolution result of the plurality of feature data and the plurality of weight data.

10. The neuromorphic arithmetic device of claim 1, wherein the shift adder generating the result data using, for each combination of the weight digit and the feature digit the corresponding partial sum data when the monitoring result indicates that the bits of the plurality of feature data corresponding to the feature digit are not all zero and that the bits of the plurality of weight data corresponding to the weight digit are not all zero includes:
left-shifting the corresponding partial sum data according to the value of the weight digit and the value of the feature digit.

11. A method of operating a neuromorphic arithmetic device, the method comprising:
receiving, by an input circuit, a plurality of feature data, each feature data comprising a plurality of bits respectively corresponding to a plurality of feature digits;
receiving, by the input circuit, a plurality of weight data, each weight data comprising a plurality of bits respectively corresponding to a plurality of weight digits;
outputting, by the input circuit, a monitoring result indicating for each feature digit whether the corresponding bits in the plurality of feature data are all zero and indicating for each weight digit whether the corresponding bits in the plurality of weight data are all zeros;
generating, by a partial sum generator, corresponding partial sum data when the monitoring result indicates that the bits of the plurality of feature data corresponding to the feature digit are not all zero and that the bits of the plurality of weight data corresponding to the weight digit are not all zero, and not generating the corresponding partial sum data when the monitoring result indicates that the bits of the plurality of feature data corresponding to the feature digit are all zero, that the bits of the plurality of weight data corresponding to the weight digit are all zero, or both; and
generating, by a shift adder, result data using, for each combination of the weight digit and the feature digit:
the corresponding partial sum data when the monitoring result indicates that the bits of the plurality of feature data corresponding to the feature digit are not all zero and that the bits of the plurality of weight data corresponding to the weight digit are not all zero, and
a zero value when the monitoring result indicates that the bits of the plurality of feature data corresponding to the feature digit are all zero, that the bits of the plurality of weight data corresponding to the weight digit are all zero, or both, wherein the result data corresponds to a result of convolution of the plurality of feature data with the plurality of weight data.

12. The method of claim 11, wherein generating the corresponding partial sum data comprises:
determining a plurality of feature bits corresponding to bits of the plurality of feature data corresponding to a selected feature digit,
determining a plurality of weight bits corresponding to bits of the plurality of weight data corresponding to a selected weight digit,
generating a plurality of multiplication bits by bit-wise multiplying the plurality of feature bits by the plurality of weight bits, respectively;
generating an analog signal corresponding to a sum of the plurality of multiplication bits;
sampling the analog signal; and
converting the sampled analog signal into a digital signal to generate the corresponding partial sum data.

13. The method of claim 12,
wherein each feature data further comprises a sign bit,
wherein each weight data further comprises a sign bit, and
wherein each partial sum data further comprises a sign bit.

14. The method of claim 13, further comprising:
for each combination of the weight digit and the feature digit, when the monitoring result indicates that the bits of the plurality of feature data corresponding to the feature digit are not all zero and that the bits of the plurality of weight data corresponding to the weight digit are not all zero, determining the sign bit of the corresponding partial sum data is determined according to the sign bits of each of the plurality of weight data and the sign bits of each of the plurality of feature data.

15. The method of claim 11, wherein generating the result data using, for each combination of the weight digit and the feature digit the corresponding partial sum data when the monitoring result indicates that the bits of the plurality of feature data corresponding to the feature digit are not all zero and that the bits of the plurality of weight data corresponding to the weight digit are not all zero includes:
left-shifting the corresponding partial sum data according to the value of the weight digit and the value of the feature digit.

* * * * *